United States Patent
Takenouchi

(10) Patent No.: US 9,681,025 B2
(45) Date of Patent: Jun. 13, 2017

(54) NON-TRANSITORY COMPUTER READABLE RECORDING MEDIUM CONFIGURED TO CAUSE A COMPUTER OF AN INFORMATION PROCESSING APPARATUS TO EXECUTE A METHOD, THE INFORMATION PROCESSING APPARATUS CAPABLE OF CONTROLLING A PERIPHERAL DEVICE THAT PERFORMS AT LEAST ONE OF AN IMAGE INPUT OPERATION AND AN IMAGE OUTPUT OPERATION BASED ON AN ICC PROFILE, AND CORRESPONDING CONTROL METHOD

(71) Applicant: CANON KABUSHIKI KAISHA, Tokyo (JP)

(72) Inventor: Takuya Takenouchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/956,235

(22) Filed: Dec. 1, 2015

(65) Prior Publication Data
US 2016/0165097 A1    Jun. 9, 2016

(30) Foreign Application Priority Data
Dec. 5, 2014    (JP) ................. 2014-247330

(51) Int. Cl.
*G06K 15/02* (2006.01)
*H04N 1/60* (2006.01)
(Continued)

(52) U.S. Cl.
CPC ............. *H04N 1/603* (2013.01); *G06F 3/048* (2013.01); *H04N 1/00411* (2013.01); *H04N 1/2315* (2013.01); *H04N 2201/0094* (2013.01)

(58) Field of Classification Search
USPC ................................. 358/1.9, 1.15, 1.16, 448
See application file for complete search history.

(56) References Cited

U.S. PATENT DOCUMENTS

| 6,525,721 | B1 * | 2/2003 | Thomas ................ G06F 3/0481 345/594 |
| 2003/0142330 | A1 * | 7/2003 | Arakawa ................ G06K 15/00 358/1.9 |

(Continued)

FOREIGN PATENT DOCUMENTS

| EP | 1152322 A2 | 11/2001 |
| JP | 2003-280873 A | 10/2003 |

*Primary Examiner* — Marcellus Augustin
(74) *Attorney, Agent, or Firm* — Canon U.S.A., Inc. IP Division

(57) ABSTRACT

An acquisition unit acquires information in terms of a type of a device to be used. A storage unit stores a plurality of ICC profiles corresponding to respective devices. A generation unit generates a list of descriptions of usable ICC profiles. A determination unit determines whether the generated list includes a description of an ICC profile including the information unit in terms of the type of the device to be used. In a case where the determination made by the determination unit is affirmative, a change unit changes the description of determined ICC profile to a description including the information in terms of a device model name of the device to be used. A providing unit provides the list generated by the generation unit or the list changed by the change unit to a user.

21 Claims, 15 Drawing Sheets

(51) Int. Cl.
*G06F 3/048* (2013.01)
*H04N 1/00* (2006.01)
*H04N 1/23* (2006.01)

(56) References Cited

U.S. PATENT DOCUMENTS

| | | | |
|---|---|---|---|
| 2004/0004731 A1* | 1/2004 | Itagaki | H04N 1/6094 358/1.9 |
| 2004/0008372 A1* | 1/2004 | Akashi | H04N 1/00209 358/1.15 |
| 2004/0021900 A1* | 2/2004 | Arakawa | G06K 15/00 358/1.15 |
| 2006/0015477 A1 | 1/2006 | Mitani | |
| 2008/0137137 A1 | 6/2008 | Yamada | |
| 2015/0074644 A1* | 3/2015 | Oberheide | G06F 17/30477 717/122 |

* cited by examiner

FIG. 3A

| | | |
|---|---|---|
| 301 | FILE NAME | 001.icc |
| 302 | DESCRIPTION | Scanner type1 |
| 303 | DATE/TIME OF GENERATION | 8/5/2014 11:01 |
| 304 | PROFILE CLASS | scnr |
| 305 | DEVICE MODEL CHARACTERISTIC | 000...000 |

FIG. 3B

| | | |
|---|---|---|
| 311A | Scanner 1000 series | Scanner 2000 series | Scanner 3000 series |
| 312A | 001.icc | | |

| | | |
|---|---|---|
| 311B | Scanner 4000 series | Scanner 5000 series |
| 312B | 002.icc | |

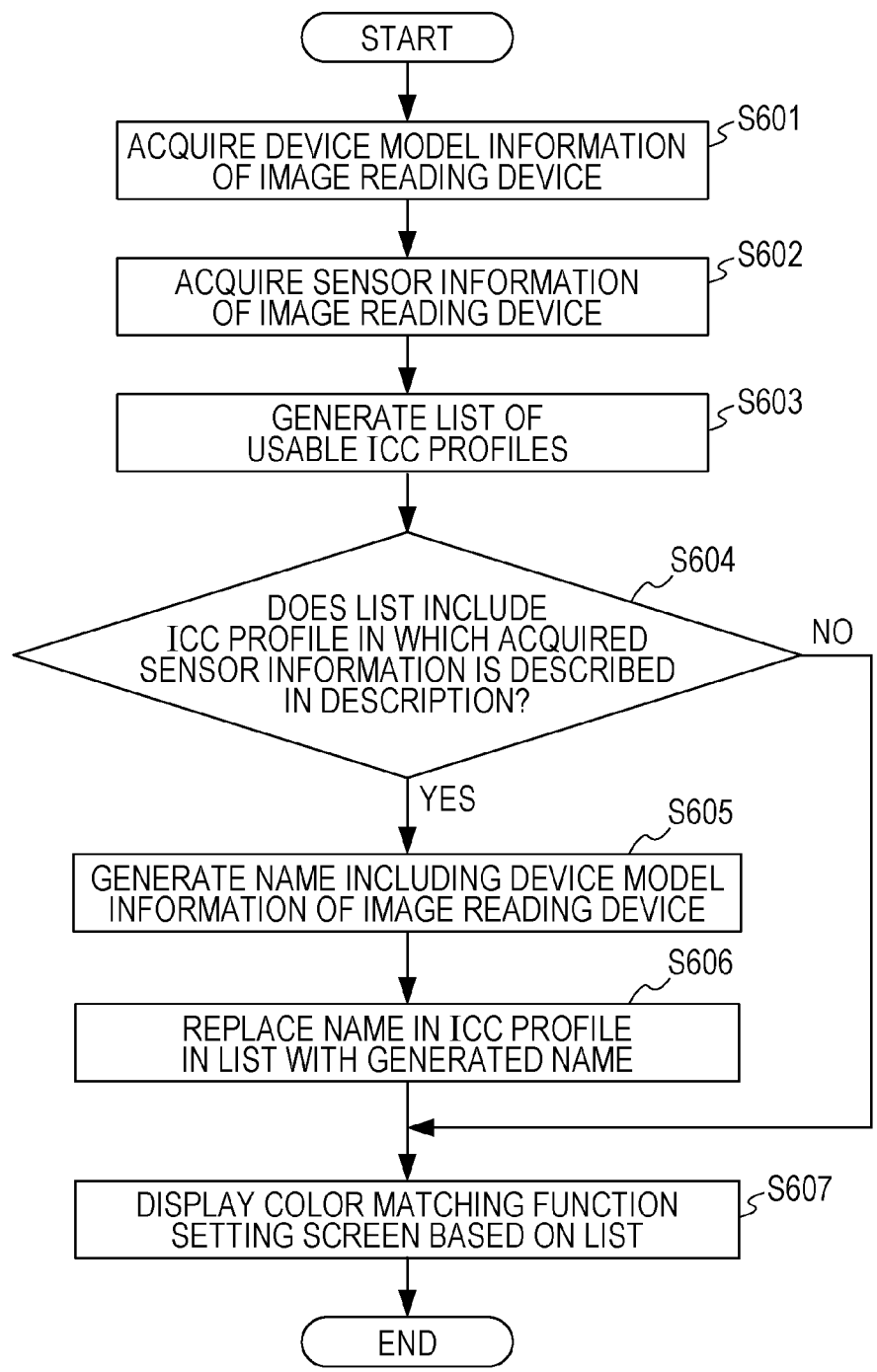

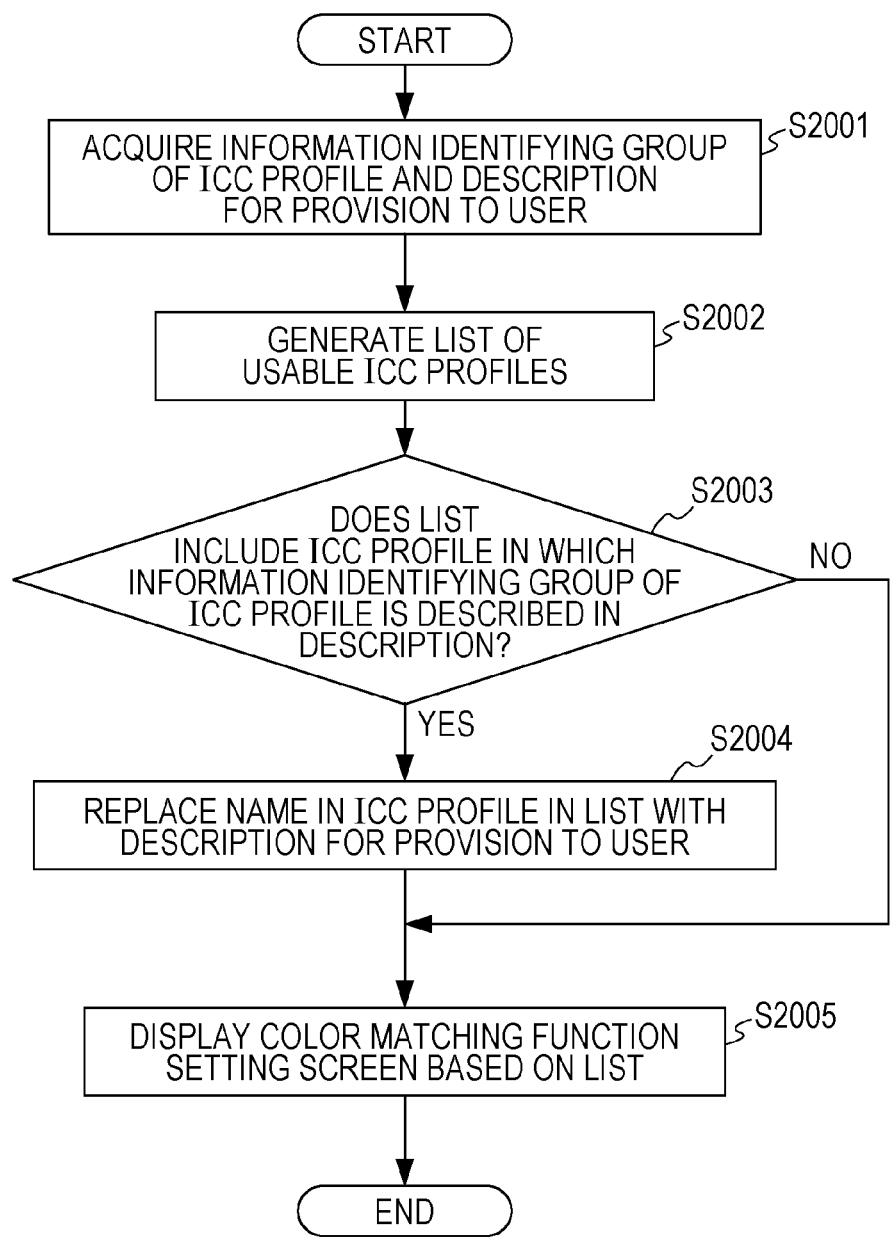

NON-TRANSITORY COMPUTER READABLE RECORDING MEDIUM CONFIGURED TO CAUSE A COMPUTER OF AN INFORMATION PROCESSING APPARATUS TO EXECUTE A METHOD, THE INFORMATION PROCESSING APPARATUS CAPABLE OF CONTROLLING A PERIPHERAL DEVICE THAT PERFORMS AT LEAST ONE OF AN IMAGE INPUT OPERATION AND AN IMAGE OUTPUT OPERATION BASED ON AN ICC PROFILE, AND CORRESPONDING CONTROL METHOD

BACKGROUND OF THE INVENTION

Field of the Invention

The present invention relates to an information processing apparatus using an ICC profile, an information processing method, and an information processing program.

Description of the Related Art

In some conventional input devices such as a scanner or an output devices such as a printer, a color image is represented by a device-specific method which may be different from one device to another. To handle such a situation, it is known to configure an image control program, that controls the input device or the output device, so as to include profile data such as an ICC profile indicating a color representation characteristic such that a color conversion process called color matching is performed properly according to the profile data depending on the device. When the color conversion is performed in the above-described manner, it is necessary to select a proper ICC profile used. Usable ICC profiles are displayed on a user interface (hereinafter referred to as a UI) to prompt a user to make a selection.

The ICC profile may further include description information (hereinafter referred to simply as a description) in terms of, for example, a name, a file generation date, and the like. The ICC profile is provided individually for each input device or output device and thus the description includes device information indicating an input device or an output device which uses the ICC profile. When a user uses a plurality of input/output devices, as many ICC profiles are provided as the number of input/output devices used, which may make it difficult to select a proper ICC profile. To handle this situation, it has been proposed that candidates for an ICC profile to be selected in the color conversion process are displayed such that only ICC profiles selected in advance by a user are displayed thereby improving usability (Japanese Patent Laid-Open No. 2003-280873).

However, in the technique disclosed in Japanese Patent Laid-Open No. 2003-280873, a user is supposed to specify, in advance, particular ICC profiles to be used in the color conversion process.

SUMMARY OF THE INVENTION

In view of the above, the present disclosure provides an information processing apparatus configured to control one or more devices each configured to perform at least one of an image input operation and an image output operation based on an ICC profile, including a first obtaining unit configured to obtain information in terms of a name of a device to be used, a second obtaining unit configured to obtain information in terms of a type of the device to be used, a storage unit configured to store a plurality of ICC profiles corresponding to respective devices, a generation unit configured to, based on the ICC profiles stored in the storage unit, generate a list of descriptions of ICC profiles usable by the information processing apparatus, a determination unit configured to determine whether the list generated by the generation unit includes a description of an ICC profile including the information obtained by the second obtaining unit in terms of the type of the device to be used, a change unit configured to, in a case where the determination made by the determination unit is affirmative, change the description of the list generated by the generation unit to a description including the information in terms of a name of the device obtained by the first obtaining unit, and a providing unit configured to provide the list generated by the generation unit or the list changed by the change unit to a user.

Further features of the present invention will become apparent from the following description of exemplary embodiments with reference to the attached drawings.

BRIEF DESCRIPTION OF THE DRAWINGS

FIGS. 3A and 3B are diagrams for illustrating ICC profiles according to the first embodiment.

FIG. 6 is a flow chart of a process of generating a profile list according to the first embodiment.

FIG. 17 is a flow chart of a process of generating a profile list according to the sixth embodiment.

DESCRIPTION OF THE EMBODIMENTS

Embodiments of the present disclosure are described in detail below with reference to accompanying drawings.

Note that these embodiments are described by way of example only and not limitation. Also note that all parts, elements, or steps described in embodiments are not necessarily needed to practice the invention.

First Embodiment

In a first embodiment, a multi function peripheral (hereinafter referred to as an MFP) having a scanner function and a printing function is described below as an example of an input/output device. Furthermore, an information processing apparatus having a driver for controlling the input/output device is also described.

Figure 1:
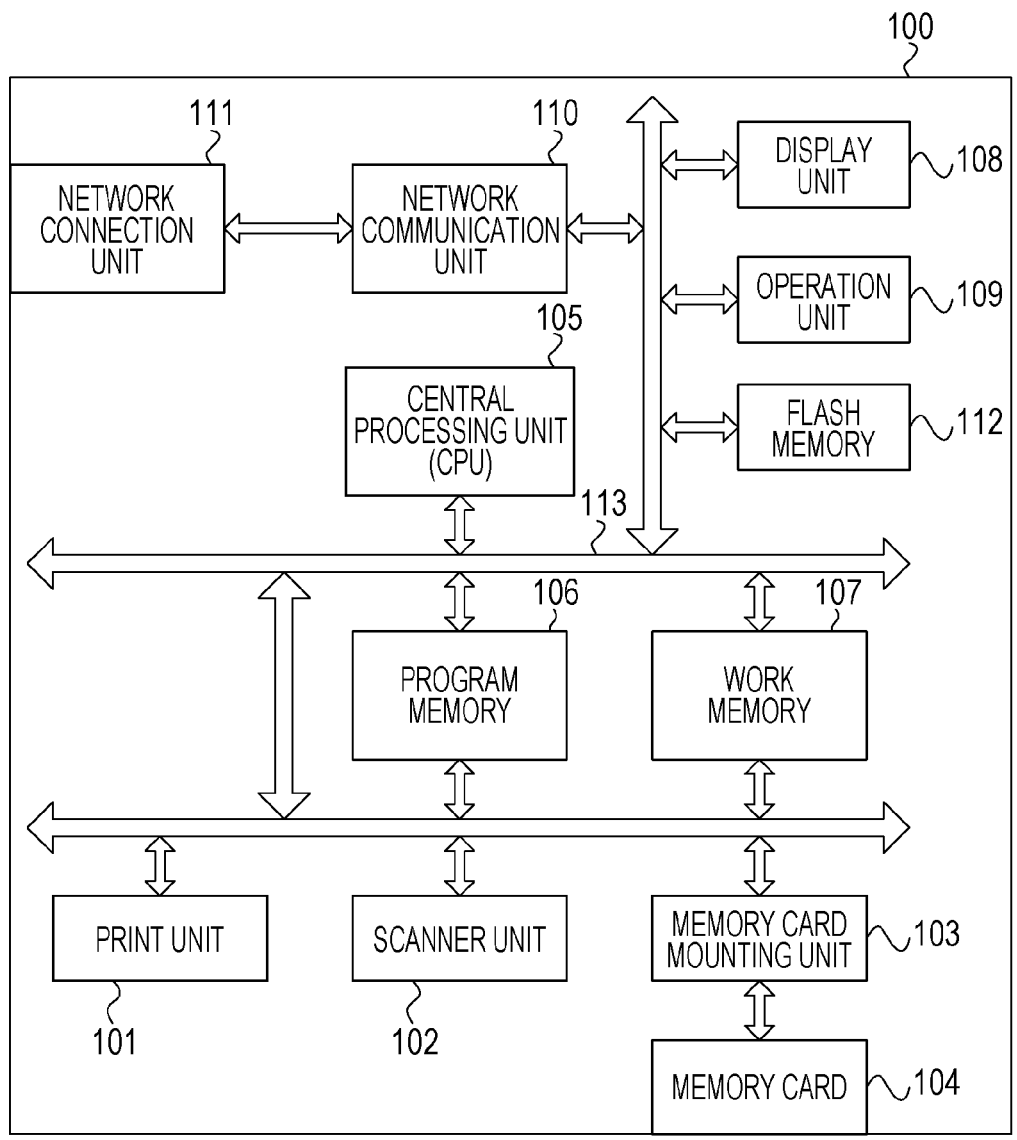
FIG. 1 is a diagram illustrating a hardware configuration of an input/output device according to a first embodiment.

FIG. 1 is a block diagram schematically illustrating a configuration of an MFP, which is an example of an input/output device. The MFP 100 has a printer function, a scanner function, and a storage function, and is capable of providing service associated with each function via a network. Note that the device managed by the information processing apparatus is not limited to the MFP, but the information processing apparatus may mange other types of devices, for example, a single function input device such as an image reading device having only a scanner function, a single function output device such as a printer having only a print function, or the like. That is, in the present embodiment, the information processing apparatus may control at least one of an input device and an output device.

The MFP 100 includes a central processing unit (CPU) 105, a program memory 106, a work memory 107, a display unit 108, an operation unit 109, a flash memory 112, and a network communication unit 110. The MFP 100 further includes a printer unit 101, a scanner unit 102, a memory card mounting unit 103, and a network communication unit 110. These are connected via a system bus 113.

The central processing unit (CPU) 105 controls the whole MFP 100 according to a program stored in the program memory 106. The program memory 106 may be, for example, a ROM, and the program memory 106 stores a program code to be read out by the CPU 105, fixed data necessary in various operations of the MFP 100, and the like. The work memory 107 may be, for example, a RAM, and is used to temporarily store image data or the like or to perform buffering in an operation associated with each function. Note that image data received from an external apparatus is temporality stored in the work memory 107.

The display unit 108 may be, for example, a touch-panel liquid crystal display and is used to display a state of the MFP 100 and information associated with various kinds of settings.

The operation unit 109 includes various switches for use by a user to make various settings as described later. In a case where a touch panel is used, at least a part of the operation unit 109 is formed integrally with the display unit 108.

In the MFP 100, the printer function is realized by the printer unit 101, the scanner function is realized by the scanner unit 102, and the storage function is realized by the memory card mounting unit 103 and the memory card 104.

The printer unit 101 prints an image on a recording medium such as printing paper by proper one of printing techniques such an ink-jet printing technique, an electrophotogaraphic printing technique, and the like based on print data received from the outside or image data stored in the memory card 104.

The scanner unit 102 optically reads a document set on a document plate and converts it to electronic data (image data). That is, the scanner unit 102 reads the document and generates image data thereof. The scanner unit 102 may further convert the image data into a specified file format, and may transmit it to an external apparatus via a network or store it in a storage area (not shown) in the MFP.

In a case where the MFP 100 makes a copy of a document put on the document plate, image data is generated by reading the document using the scanner unit 102, and the resultant image data is transferred to the printer unit 101. The printer unit 101 prints an image on printing paper based on the document data.

The MFP 100 may receive data edited by an external apparatus and store the received data. For example, a file stored in the memory card 104 may be read by an external apparatus connected to the MFP 100 via a network. After the file is edited, the resultant file may be stored in the memory card from the external apparatus.

The network communication unit 110 connects the MFP 100 to the network so as to make it possible to perform various communications. A network connection unit 111 is a connection unit for connecting the network communication unit 110 to a network medium. The network communication unit 110 may support, for example, at least one of wired LAN communication and wireless LAN communication. In a case where the network communication unit 110 supports the wired LAN communication, the network connection unit 111 is a connector for connecting a wired LAN cable to the MFP 100. On the other hand, in a case where the network communication unit 110 supports the wireless LAN communication, the network connection unit 111 is an antenna.

The flash memory 112 is a nonvolatile memory for storing data received by the network communication unit 110.

Figure 2:
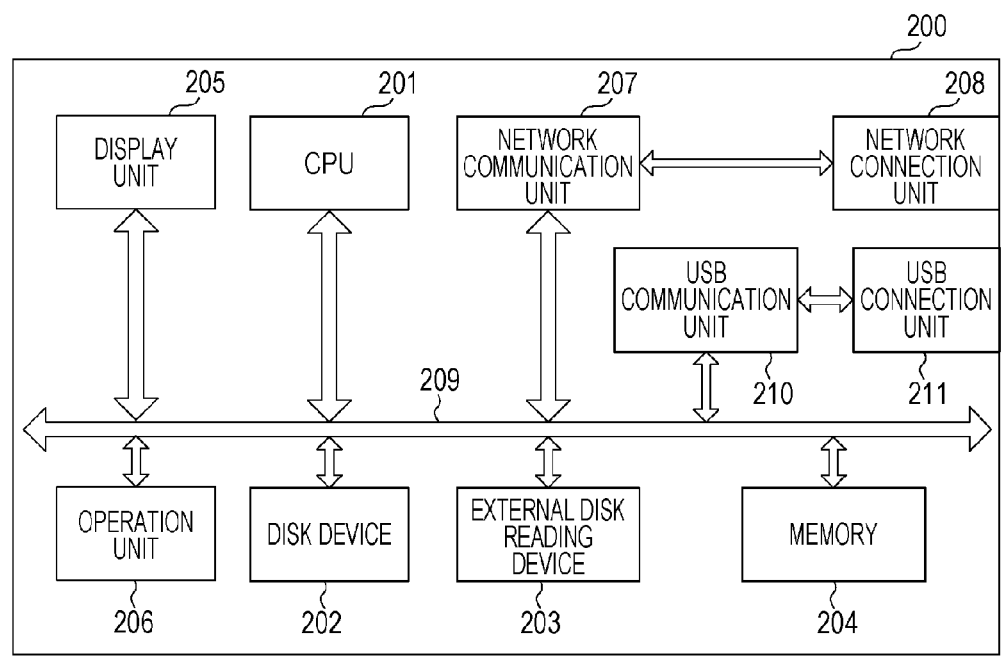
FIG. 2 is a diagram illustrating a hardware configuration an information processing apparatus according to the first embodiment.

FIG. 2 is a block diagram schematically illustrating a configuration of a PC, which is an example of an information processing apparatus according to the present embodiment.

A PC 200 is a personal computer which may be, for example, a smart PC such as a smartphone, a tablet PC, or the like. Note that the PC 200 may be an ordinary PC.

As illustrated in FIG. 2, the PC 200 includes a CPU 201, a disk device 202, an external disk reading device 203, a memory 204, a display unit 205, an operation unit 206, a network communication unit 207, and a USB communication unit 210. These are connected to each other via a system bus 209.

The CPU 201 controls various parts of the PC 200 according to a program. The disk device 202 is a device in which an application program read by the CPU 201, an operating system (OS), and the like are installed, and various kinds of files or the like are stored.

The external disk reading device 203 reads out a content of an external storage medium such as a CD-ROM disk.

The memory 204 is a memory for use by the CPU 201 to temporarily store data, perform buffering, or the like as required.

The display unit 205 may be realized, for example, by a touch-panel liquid crystal display, and is used to display information described below or information associated with various kinds of settings.

The operation unit 206 includes a keyboard, a mouse, and the like, and is allowed to be used by a user to input information associated with various kinds of settings. In a case where a touch panel is used, at least a part of the operation unit 206 is formed integrally with the display unit 205.

The network communication unit 207 is a communication unit for connecting to a network to make a various kinds of communications and the network connection unit 208 is a connection unit for connecting the network communication unit 207 to a network medium.

Like the MFP 100, the network communication unit 207 and the network connection unit 208 may support, for example, at least one of wired LAN communication and wireless LAN communication. Like the network communication unit 110 and the network connection unit 111 disposed in the MFP 100, the network communication unit 207 and the network connection unit 208 have necessary functions and are configured in proper forms depending on the supported LAN.

The USB communication unit 210 is a communication unit for communicating with various kinds of peripheral devices via a USB interface. The USB connection unit 211 is a connection unit such as a USB connector or the like. In the present embodiment, the PC 200 acquires image data read by the scanner unit 102 of the MFP 100 via a driver described below using an ICC profile. Herein the ICC profile is profile data indicating a color representation characteristic of an input device or an output device. By performing a color matching process (a color conversion process) on image data according to the ICC profile, it becomes possible to properly input or output a desired image. FIG. 3A illustrates an example of an ICC profile. An ICC profile is defined for each device (an input device or an output device). Therefore, a plurality of ICC profiles are stored in the memory 204 of the PC 200 that controls devices (input/output devices).

Note that FIG. 3A illustrates an example of information embedded in an ICC profile.

As illustrated in FIG. 3A, the ICC profile includes a file name 301, a description 302, a generation data/time 303, a profile class 304, and a device model characteristic 305.

The file name 301 is a file name of the ICC profile.

The description 302 is information describing the ICC profile. In the present embodiment, sensor information is described in the description 302. In a case where grouping is performed, information identifying a group is described in the description 302 as will be explained in detail below. The information described in the description 302 is displayed in a display list as will be described later.

The generation data/time 303 is information indicating a date/time when the ICC profile is generated.

The profile class 304 is identification information identifying the ICC profile. By using the profile class 304, it becomes possible to filter information in a situation in which, for example, it is desirable to refer to only input profiles corresponding to input devices or only output profiles corresponding to output devices. The profile class 304 describes, for example, identification information "scnr" identifying an input device, identification information "mntr" identifying a display, or the like.

The device model characteristic 305 is characteristic information of a device model of an input device or an output device. The device model characteristic 305 has a field allowed to be defined by a vendor that provides an ICC profile. User of this field makes it possible to identify the ICC profile.

In the present embodiment, when the PC 200 installs a device driver described later, a table including an ICC profile, a file name, and information identifying a device group (hereinafter, referred to also as group identification information) is stored. More specifically, this table is stored in a device management unit of the disk device 202 as described later. In the present embodiment, it is assumed by way of example that the group identification information includes sensor information ("Scanner type 1" or the like) described later. The ICC profile is installed in a system folder of an OS.

In the present embodiment, in a case where it is allowed to share an ICC profile, the ICC profile is shared. That is, the disk device 202 of the PC 200 is prevented from including identical ICC profiles. More specifically, devices (input devices or output devices) that use the same ICC profile are grouped, and each group shares one ICC profile. The ICC profile includes information identifying the group that shares the ICC profile. In the present embodiment, it is assumed by way of example that the description of the ICC profile includes sensor information as group identification information of the ICC profile.

FIG. 3B is a diagram for illustrating a manner of grouping ICC profiles. In FIG. 3B, a device model name 311 (311A, 311B) is a name of a device (an input device or an output device). A file name 312 (312A, 312B) is a file name of an ICC profile shared by a group.

In the example illustrated in FIG. 3B, Scanner 1000 series, Scanner 2000 series, and Scanner 3000 series share an ICC profile "001.icc". On the other hand, Scanner 4000 series and Scanner 5000 series share an ICC profile "002.icc".

Note that an ICC profile is allowed to be shared when an input characteristic or an output characteristic are the same for devices (input devices or output devices) and thus the same ICC profile is allowed to be used. For example, in a case where scanner units have sensors that are the same in type, then input characteristics are the same, and thus it is allowed to use the same ICC profile. In the present embodiment, a plurality of MFPs 100 capable of sharing ICC profiles are grouped according to the sensor of the scanner unit 102, and one ICC profile is shared by each group.

Figure 4:
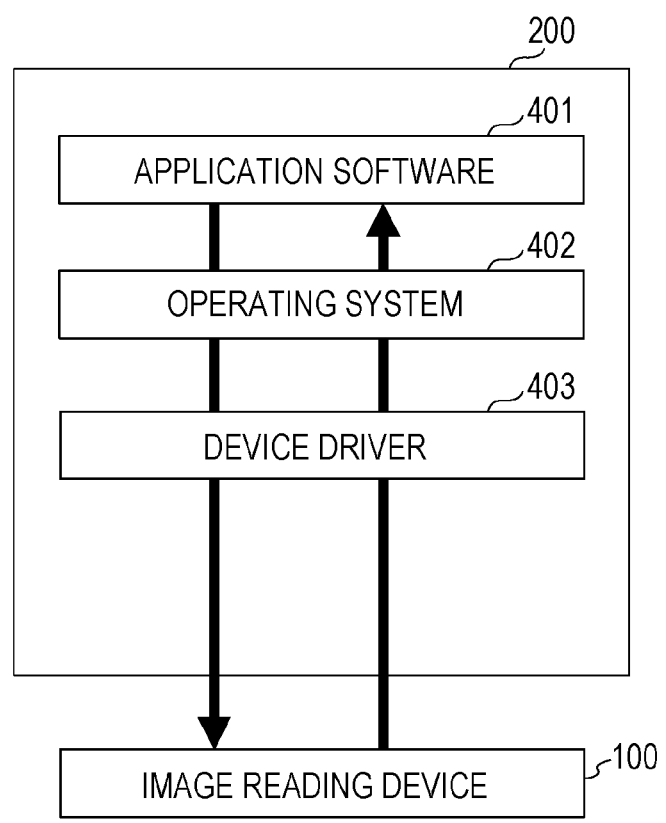
FIG. 4 is a diagram illustrating a software configuration of the information processing apparatus according to the first embodiment.

FIG. 4 is a diagram illustrating a software configuration of a control apparatus that controls an image reading device. In the present embodiment, the MFP 100 corresponds to the image reading device and the PC 200 corresponds to the control apparatus. Therefore, hereinafter, the MFP 100 and the PC 200 will also be referred to as the image reading device 100 and the control apparatus 200, respectively.

The control apparatus 200 includes an application software 401, an operating system 402, and a device driver 403. The application software 401 may issue an image acquisition command using a driver installed on an operating system such as Windows (registered trademark) of the PC 200 or using an API according to a standard defined by a vendor. The operating system 402 calls an API installed by the device driver 403. The device driver 403 transmits a control command to the image reading device to control firmware installed in the image reading device 100 so as to acquire the image specified by the application from this image reading device. In a case where no firmware is installed in the image reading device, the device driver 403 may access a control register of each module of the image reading device 100 to perform controlling in terms of shading, setting of a motor speed, and an image reading process.

In the present embodiment, when ICC profiles are installed, the device driver 403 controls the installing based on the group identification information (the sensor information in the present embodiment) such that no duplicated ICC profiles are stored in the storage unit of the control apparatus. That is, in a case where an ICC profile to be installed includes the same group identification information as that included in an already stored ICC profile, the device driver 403 does not allow this ICC profile to be stored in the control apparatus. On the other hand, in a case where an ICC profile to be installed does not include the same group identification information as that included in any already stored ICC profile, the device driver 403 allows this ICC profile to be stored in the control apparatus. The above-described storing control process is performed by the CPU 201.

In recent years, smart PCs such as a smartphone, a tablet PC, and the like have been popular. By using such smart PCs, it is possible to control an input device or an output device. Such smart PCs have a small disk capacity compared to that of a conventional desktop PC or the like. Preparing an ICC profile for each input device or output device may encroach the disk capacity. For example, the technique disclosed in Japanese Patent Laid-Open No. 2003-280873 allows it to reduce the number of ICC profiles displayed. However, there exist ICC profiles that are not displayed and thus no reduction in data size occupying the disk space is achieved. In contrast, in the present embodiment, by controlling storing ICC profiles in the above-described manner, it is possible to reduce the total data size of the ICC profiles stored in the disk space.

Figure 5:
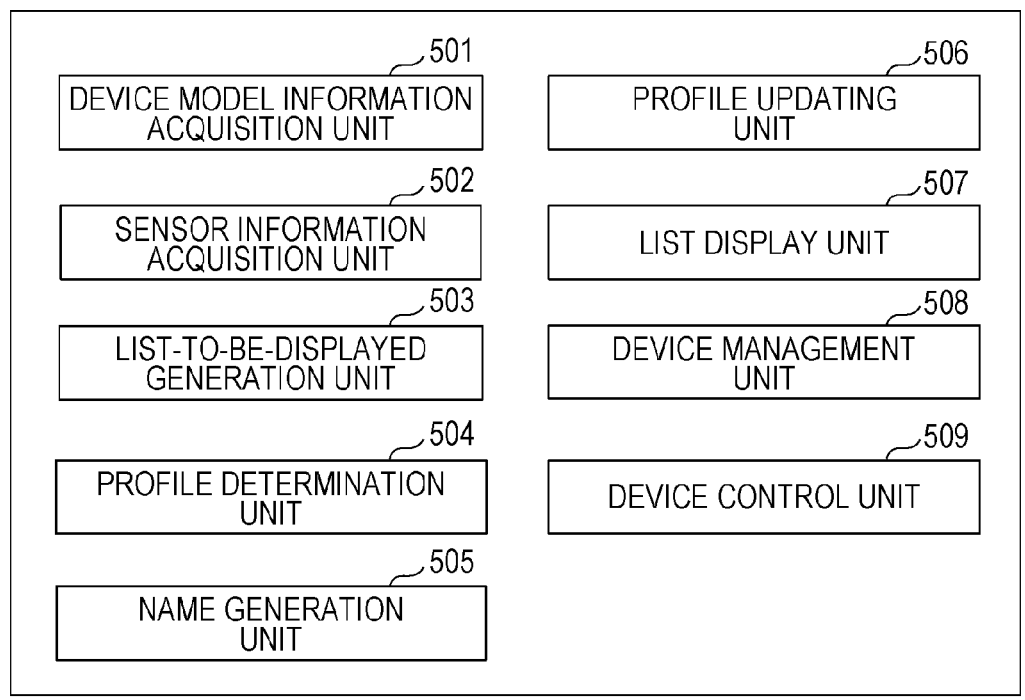
FIG. 5 is a diagram illustrating a configuration of a device driver of the information processing apparatus according to the first embodiment.

Next, referring to FIG. 5, a description is given below as to a device driver that controls the image reading device. FIG. 5 is a diagram illustrating a configuration of a device driver according to the first embodiment. As illustrated in FIG. 5, the device driver includes a device model information acquisition unit 501, a sensor information acquisition unit 502, a display list generation unit 503, a profile determination unit 504, a name generation unit 505, and a profile update unit 506. The device driver further includes a display-list display unit 507, a device management unit 508, and a device control unit 509.

The device model information acquisition unit 501 acquires information from the device management unit 508 in terms of a device model name of the image reading device 100. The sensor information acquisition unit 502 acquires information from the device management unit 508 in terms of sensor information of the image reading device 100.

To provide a display list of descriptions of input profiles to be displayed on the display-list display unit 507 for use in selection, the display list generation unit 503 generates the display list based on usable input profiles (ICC profiles) installed in the PC 200. To provide a display list of descriptions of output profiles to be displayed on the display-list display unit 507 for use in selection, the display list generation unit 503 generates the display list based on usable output profiles (ICC profiles) installed in the PC 200. Note that when an input profile is selected, not only usable input profiles but all usable profiles installed in the PC may be displayed for use in selection. Similarly, when an output profile is selected, not only usable output profiles but all usable profiles installed in the PC may be displayed for use in selection.

The profile determination unit 504 determines whether the display list includes a description of an ICC profile in which sensor information is described as the description thereof. The name generation unit 505 generates a description to be embedded in an ICC profile based on information in terms of a device model name of the image reading device 100.

Note that the name generation unit 505 generates the description so as to include information associated with the image reading device 100 as will be described in detail later.

The profile update unit 506 updates the description included in the display list.

The display-list display unit 507 provides the display list.

The device management unit 508 stores various kinds of information associated with the image reading device, for example, information in terms of a device model name of the image reading device 100, sensor information of the image reading device, and model-specific data of an image reading device. Note that the information stored and managed by the device management unit 508 is not limited to the information in terms of the device model name of the image reading device 100, the sensor information of the image reading device, or the like described above, but other information may be stored and managed. The device control unit 509 communicates with the image reading device to control a printing operation, a scanning operation, or the like and to control communication in acquiring the information in terms of the device model name, status information, or the like.

FIG. 6 is a flow chart illustrating a process of generating a profile list to be displayed on a color matching function setting screen according to the first embodiment. The process illustrated in FIG. 6 is realized, for example, by the CPU 201 by reading a program stored in the disk device 202 into the memory 204 and executing it.

In S601, the device model information acquisition unit 501 of the device driver acquires, from the device management unit 508, the information in terms of the device model name of the image reading device 100 of the device to be used. In the present embodiment, it is assumed that "Scanner 1000 series" is acquired as the information in terms of the device model name of the image reading device 100.

In S602, the sensor information acquisition unit 502 of the device driver acquires, from the device management unit 508, the sensor information of the image reading device 100 as the information in terms of the device type to be used. That is, as the information in terms of the device type to be used, identification information identifying a group to which the device to be used is grouped so as to belong when the grouping is performed according to the type of the input unit or the output unit of the device. In the present embodiment, it is assumed that "Scanner type 1" is obtained as the group identification information.

Figure 7A:
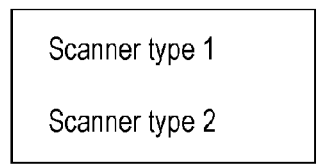
FIGS. 7A and 7B are diagrams each illustrating an example of a display list according to the first embodiment.

In S603, the display list generation unit 503 of the device driver generates, from usable ICC profiles, a display list in which descriptions of the ICC profiles are displayed. The generated display list is, as illustrated by way of example in FIG. 7A, a list of descriptions of ICC profiles usable by the PC 200. In general, the ICC profiles are installed in a system folder of the OS when the device driver is installed, and the ICC profiles in this system folder of the OS are used in generating the display list. As described above, the display list may be generated so as to limit the ICC profiles to the input profiles corresponding to input devices or so as to limit the ICC profiles to the output profiles corresponding to output devices.

In S604, the profile determination unit 504 of the device driver determines whether the display list includes a description of an ICC profile including information in terms of the type of the device to be used acquired in S602. More specifically, in the present embodiment, it is determined whether the display list generated in S603 includes a description including the sensor information of the image reading device acquired in S602. In other words, it is determined whether the display list includes a description of an ICC profile including the same sensor information as the sensor information of the image reading device acquired in S602.

In a case where the display list includes a description of an ICC profile indicating the acquired sensor information (Yes in S604), the processing flow proceeds to S605. In a case where the display list does not include a description of an ICC profile including the acquired sensor information (No in S604), the processing flow proceeds to S607.

In S605, the name generation unit 505 of the device driver generates a description including the information of the device model name of the image reading device. More specifically, based on the information in terms of the device model name of the image reading device acquired in S601, the name generation unit 505 generates the description including the device model name of the image reading device.

Figure 7B:
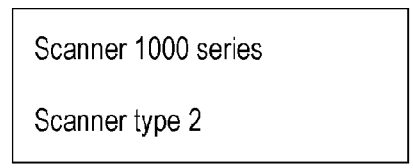

In S606, the profile update unit 506 of the device driver replaces the description including the sensor information in the display list by the description generated in S605. That is, the content of the description in the display list is changed from the sensor information to the device model name information. The display list updated by the profile update unit 506 is a list of descriptions of ICC profiles usable by the PC 200 as illustrated in FIG. 7B. However, unlike the display list illustrated in FIG. 7A, the information about the device model name is displayed for the ICC profile corresponding to the device to be used.

In S607, the display-list display unit 507 of the device driver displays a color matching function setting screen on the display unit 205 based on the display list. That is, the generated display list is provided to the display unit 205.

Figure 8:
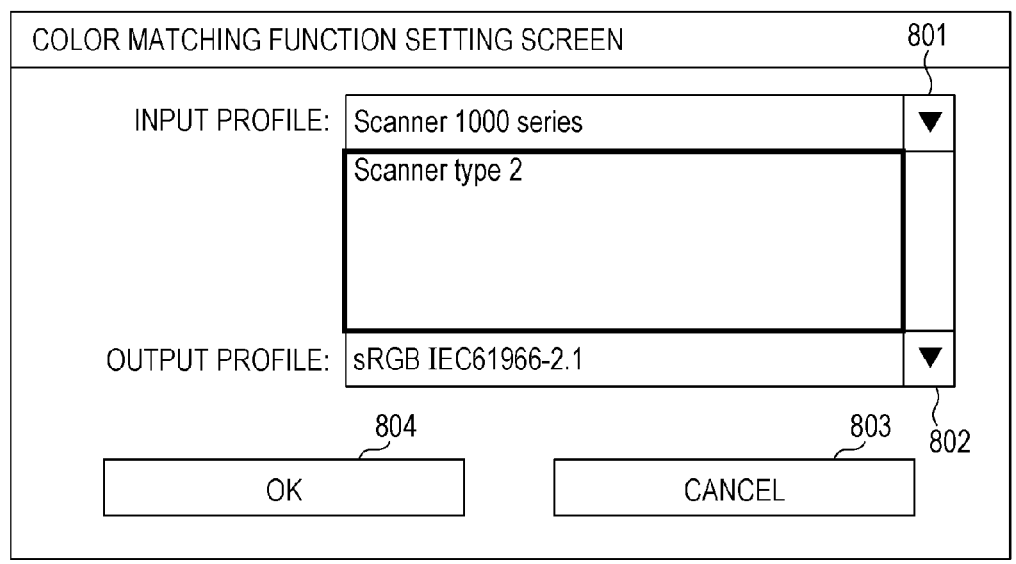
FIG. 8 is a diagram illustrating an example of a color matching function setting screen according to the first embodiment.

FIG. 8 illustrates an example of a color matching function setting screen displayed on the display unit 205. The color matching function setting screen illustrated in FIG. 8 includes input fields 801 and 802 for use in specifying ICC profiles, an OK button 804 for inputting an instruction indicating that the setting is completed, and a cancel button 803 for inputting an instruction to cancel the setting.

The input field 801 is an input field for use in specifying an ICC profile to be used in a color conversion in an image inputting operation. The input field 802 is an input field for use in specifying an ICC profile to be used in a color conversion in an image outputting operation. Inputting ICC profiles in the input field 801 and in the input field 802 may be performed via a pulldown menu. When the input field 801 or the input field 802 is selected by clicking or the like, selectable menu items are displayed. As the selectable menu items, device model names indicating usable ICC profiles are listed. More specifically, the display list generated in S603 in FIG. 6 or the display list updated in S606 is displayed. If a user selects an ICC profile and presses the OK button 804, then ICC profiles corresponding to the descriptions respectively input in the input field 801 and the input field 802 are set as profiles to be used. In the present embodiment, before the list of descriptions of ICC profiles is displayed, descriptions of ICC profiles are rewritten such that sensor information of image reading devices are replaced with device model names of the image reading devices, and the resultant list is provided to a user. This makes it easier for the user to select an ICC profile suitable for the device (the image reading device) to be used. Furthermore, in the present embodiment, as described above, ICC profiles are grouped such that ICC profiles associated with the same sensor are grouped, and one ICC profile is shared by each group. This makes it possible to reduce the total data size of ICC profiles stored in the PC 200. That is, it becomes possible to reduce the necessary disk capacity of the disk device 202.

Second Embodiment

A second embodiment is described below with reference to FIG. 9 and FIG. 10. In the present embodiment, as in the first embodiment, a plurality of image reading devices with the same sensor capable of sharing an ICC profile are grouped, and one ICC profile is shared by each group. Furthermore, only one ICC profile is allowed to be displayed for one image reading device, and it is not allowed to display a plurality of descriptions of ICC profiles for one image reading device. Except for the above, the MFP 100 and the PC 200 are configured in a similar manner to the first embodiment, and thus a further duplicated description is omitted.

Figure 9:
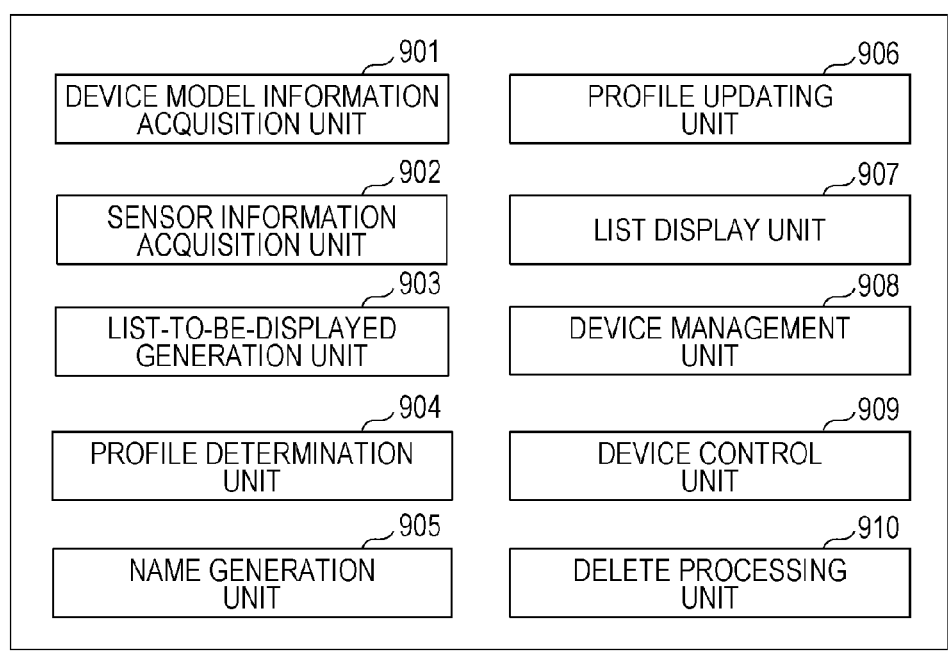
FIG. 9 is a diagram illustrating a configuration of a device driver of an information processing apparatus according to a second embodiment.

FIG. 9 is a diagram illustrating a configuration of a device driver configured to control an image reading device according to the present embodiment. Units 901 to 909 in FIG. 9 are similar to units 501 to 509 in FIG. 5, and thus a further description thereof is omitted. As illustrated in FIG. 9, the device driver according to the present embodiment further includes a delete processing unit 910. The delete processing unit 910 operates such that when a display list includes a description of information in terms of a specified device model name of an image processing apparatus and also includes a description of specified sensor information of the same image processing apparatus, the delete processing unit 910 deletes the former description from the display list. The process is explained in further detail below for the case where a display list includes a description of information in terms of a specified device model name of an image processing apparatus and also includes a description of sensor information of the same image processing apparatus. Existing of these in the display list may occur, for example, in a situation in which a first ICC profile and a second ICC profile described below are related to the same image reading device. The first ICC profile is, for example, an ICC profile including no information identifying a sensor type but including a description of information in terms of a device model name of an image reading device. The second ICC profile is an ICC profile including sensor information identifying a sensor type of an image reading device. For example, in a case where a plurality of drivers with different versions are installed in the same image processing apparatus, the first ICC profile may be related to the first version and the second ICC profile may be related to the second version according to the present embodiment. Note that the first ICC profile and the second ICC profile may or may not be the same. FIG. 10 is a flow chart of a process of generating a profile list to be displayed on the color matching function setting screen according to the present embodiment. The process in FIG. 10 is realized, for example, by the CPU 201 by reading a program stored in the disk device 202 into the memory 204 and executing it.

Figure 10:
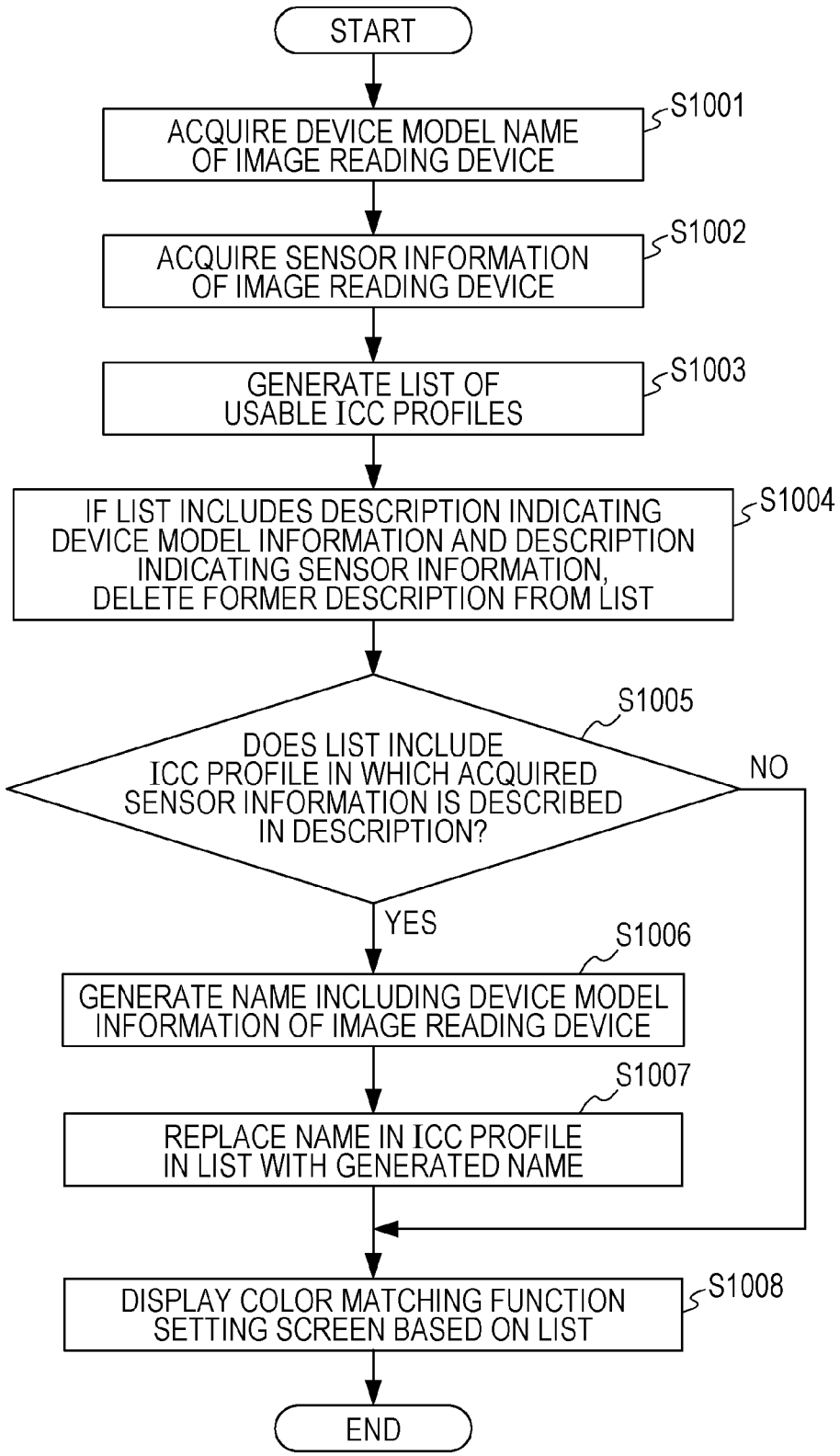
FIG. 10 is a diagram illustrating an example of a color matching function setting screen according to the second embodiment.

S1001 to S1003 in FIG. 10 are similar to S601 to S603 in FIG. 6, and thus a further description thereof is omitted. In S1004 in FIG. 10, when a description including information in terms of the device model name acquired in S1001 and a description including the sensor information acquired in S1002 are both included in the display list, the delete processing unit 910 of the device driver deletes one of them from the display list. In the present embodiment, the description including the information in terms of the device model name is deleted from the display list.

S1005 to S1008 in FIG. 10 are similar to S604 to S607 in FIG. 6, and thus a further description thereof is omitted.

In the present embodiment, as described above, only one ICC profile is allowed to be displayed for one image reading device, and it is not allowed to display a plurality of descriptions of ICC profiles for one image reading device thereby making it easier for a user to select an ICC profile suitable for the device (the image reading device) to be used.

Furthermore, in the present embodiment, as described above, ICC profiles are grouped according to the sensor, and one ICC profile is shared by each group. This makes it possible to reduce the total data size of ICC profiles stored in the PC 200. That is, it becomes possible to reduce the necessary disk capacity the disk device 202.

Third Embodiment

A third embodiment is described below with reference to FIG. 11. In the third embodiment, as in the first embodiment, a plurality of input devices capable of sharing an ICC profile are grouped and one ICC profile is shared by each group. Furthermore, only one ICC profile is allowed to be displayed for one image reading device, and it is not allowed to display a plurality of descriptions of ICC profiles for one image reading device. Except for the above, the MFP 100 and the PC 200 are configured in a similar manner to the first embodiment, and thus a further duplicated description is omitted.

In the present embodiment, a device driver for controlling an image reading device is similar in configuration to that according to the second embodiment illustrated in FIG. 9 except that the delete processing unit 910 functions differently. In the present embodiment, the delete processing unit 910 functions such that when a description including information in terms of a specified device model name and a description including specified sensor information are both included in a display list, the delete processing unit 910 deletes one of these descriptions from the display list. More specifically, in the present embodiment, a generation date/time is acquired for each ICC profile from a header of the ICC profile, and an ICC profile with an earlier generation date/time is deleted from the display list.

Figure 11:
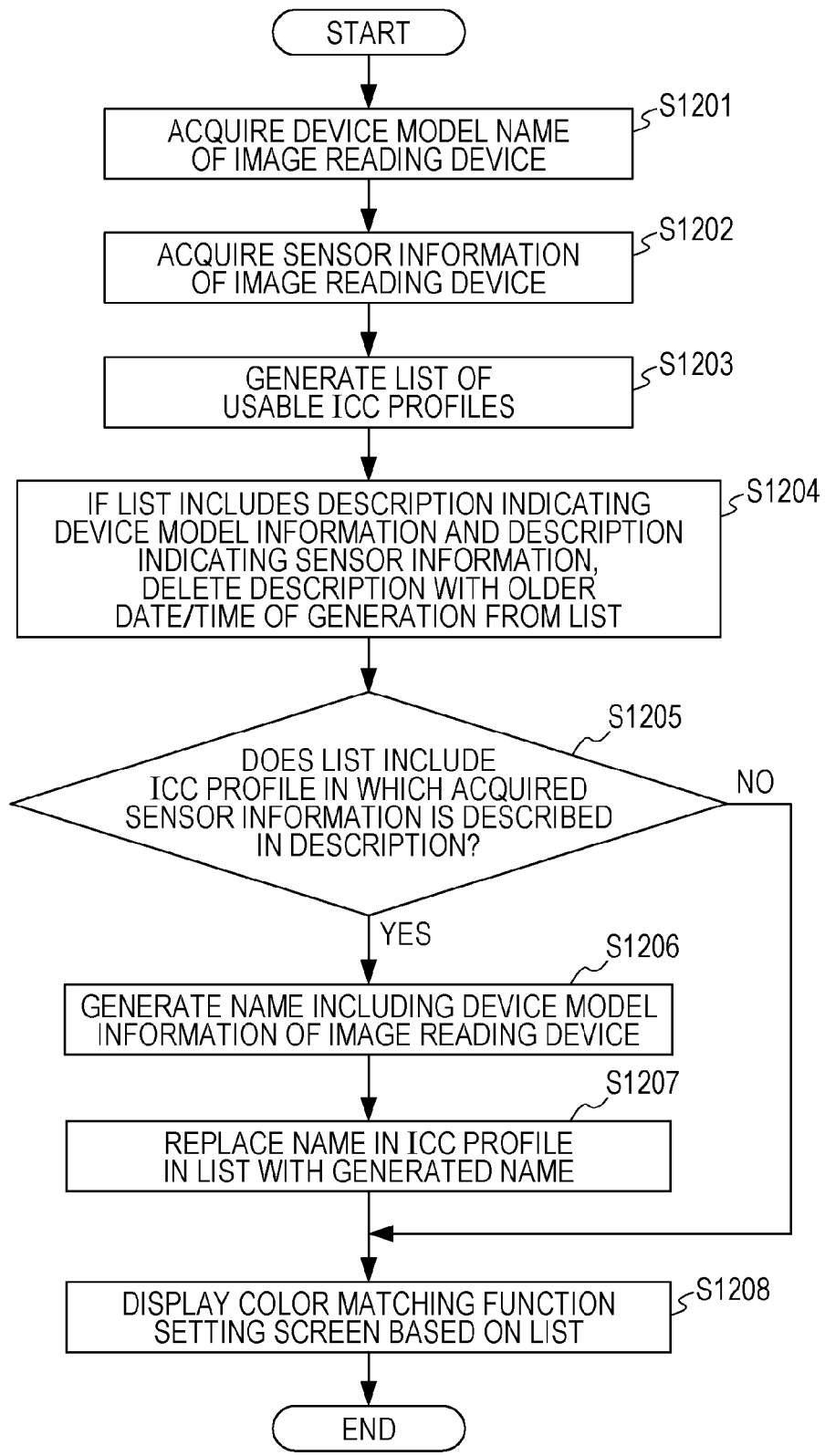
FIG. 11 is a flow chart of a process generating a profile list according to a third embodiment.
Figure 12:
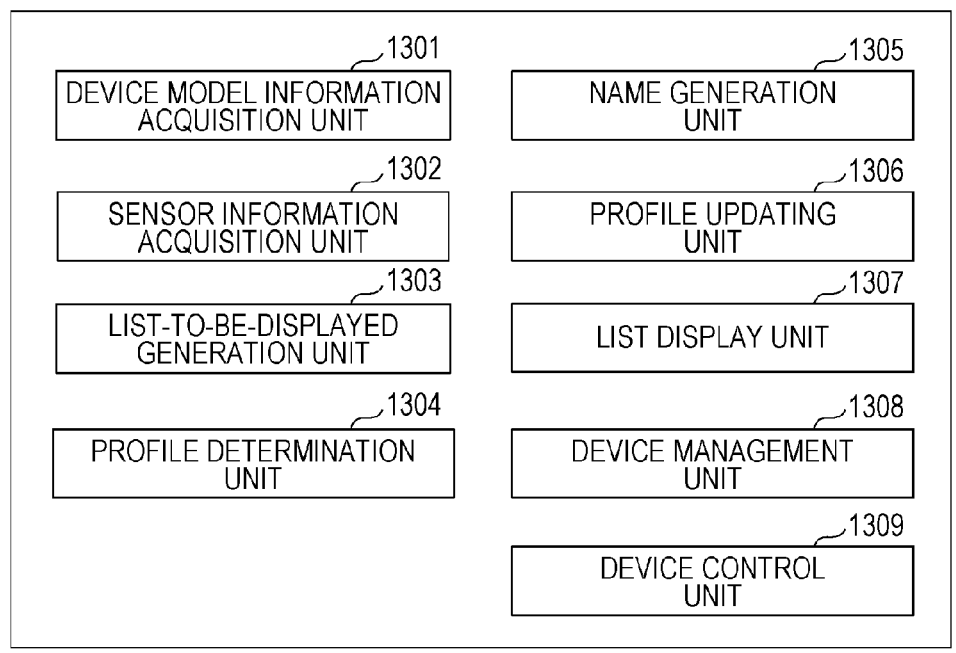
FIG. 12 is a diagram illustrating a configuration of a device driver of an information processing apparatus according to a fourth embodiment.

FIG. 11 is a flow chart of a process of generating a profile list to be displayed on the color matching function setting screen according to the present embodiment. The process in FIG. 12 is realized, for example, by the CPU 201 by reading a program stored in the disk device 202 into the memory 204 and executing it.

S1201 to S1203 in FIG. 11 are similar to S601 to S603 in FIG. 6, and thus a further description thereof is omitted.

In S1204 in FIG. 11, when a description describing the device model name acquired in S1201 and a description including sensor information acquired in S1202 are both included in the display list, the delete processing unit 910 of the device driver deletes one of them. More specifically, an ICC profile with an earlier generation date/time is deleted from the display list. In the present embodiment, the generation date/time of each profile is acquired from a header of the ICC profile and, based on this, a determination is performed as to which ICC profile has an earlier generation date/time.

S1205 to S1208 in FIG. 11 are similar to S604 to S607 in FIG. 6, and thus a further description thereof is omitted.

In the present embodiment, an ICC profile with an earlier generation date/time is not provided to a user, but a description of an ICC profile with a newer generation date/time is substituted into a description including information associated with an image reading device, and the result is provided to the user. This makes it easier for the user to select an ICC profile suitable for the device (the image reading device) to be used.

Furthermore, in the present embodiment, as described above, ICC profiles are grouped such that ICC profiles associated with the same sensor are grouped, and one ICC profile is shared by each group. This makes it possible to reduce the total data size of ICC profiles stored in the PC 200. That is, it becomes possible to reduce the necessary disk capacity of the disk device 202.

In the present embodiment, as described above, the deleting process is performed based on the generation date/time of each profile acquired from the header of the ICC profile. However, the manner of the deleting process is not limited to this. For example, an ICC profile in a file with an earlier date/time of generating or updating the file may be deleted. Instead of according to the generation date/time or the update date/time, a flag may be described in a field allowed to be defined by a vendor, and the determination as to which description is to be deleted from the display list may be made according to the flag.

Fourth Embodiment

A fourth embodiment is described below with reference to FIG. 12 and FIG. 13. In the first to third embodiments described above, information in terms of a device model name and sensor information of an image reading device are acquired from a management unit in a device driver. In contrast, in the present embodiment, the information in terms of the device model name and the sensor information are acquired from the image reading device. Except for the above, the MFP 100 and the PC 200 are configured in a similar manner to the first embodiment, and thus a further duplicated description is omitted.

FIG. 12 is a diagram illustrating a configuration of a device driver configured to control an image reading device according to the present embodiment. As illustrated in FIG. 12, the device driver includes a device model information acquisition unit 1301, a sensor information acquisition unit 1302, a display list generation unit 1303, a profile determination unit 1304, a name generation unit 1305, and a profile update unit 1307. The device driver further includes a device management unit 1308 and a device control unit 1309.

The device model information acquisition unit 1301 acquires information in terms of a device model name of the image reading device 100 by communicating with the image reading device 100 via the device control unit 1309.

The sensor information acquisition unit 1302 acquires sensor information of the image reading device 100 as the information in terms of the device type to be used by communicating with the image reading device 100 via the device control unit 1309.

Units 1303 to 1307 in FIG. 12 are similar to units 503 to 507 in FIG. 5, and thus a further description thereof is omitted.

The device management unit 1308 stores and manages information acquired by the device model information acquisition unit 1301 and the sensor information acquisition unit 1302. The information stored and managed by the device management unit 1308 is not limited to the information acquired by the device model information acquisition unit 1301 or the sensor information acquisition unit 1302, but other information may be stored and managed.

The device control unit 1309 communicates with the image reading device to control a printing operation, a scanning operation, or the like and control communication in acquiring the information in terms of the device model name, status information, or the like.

Figure 13:
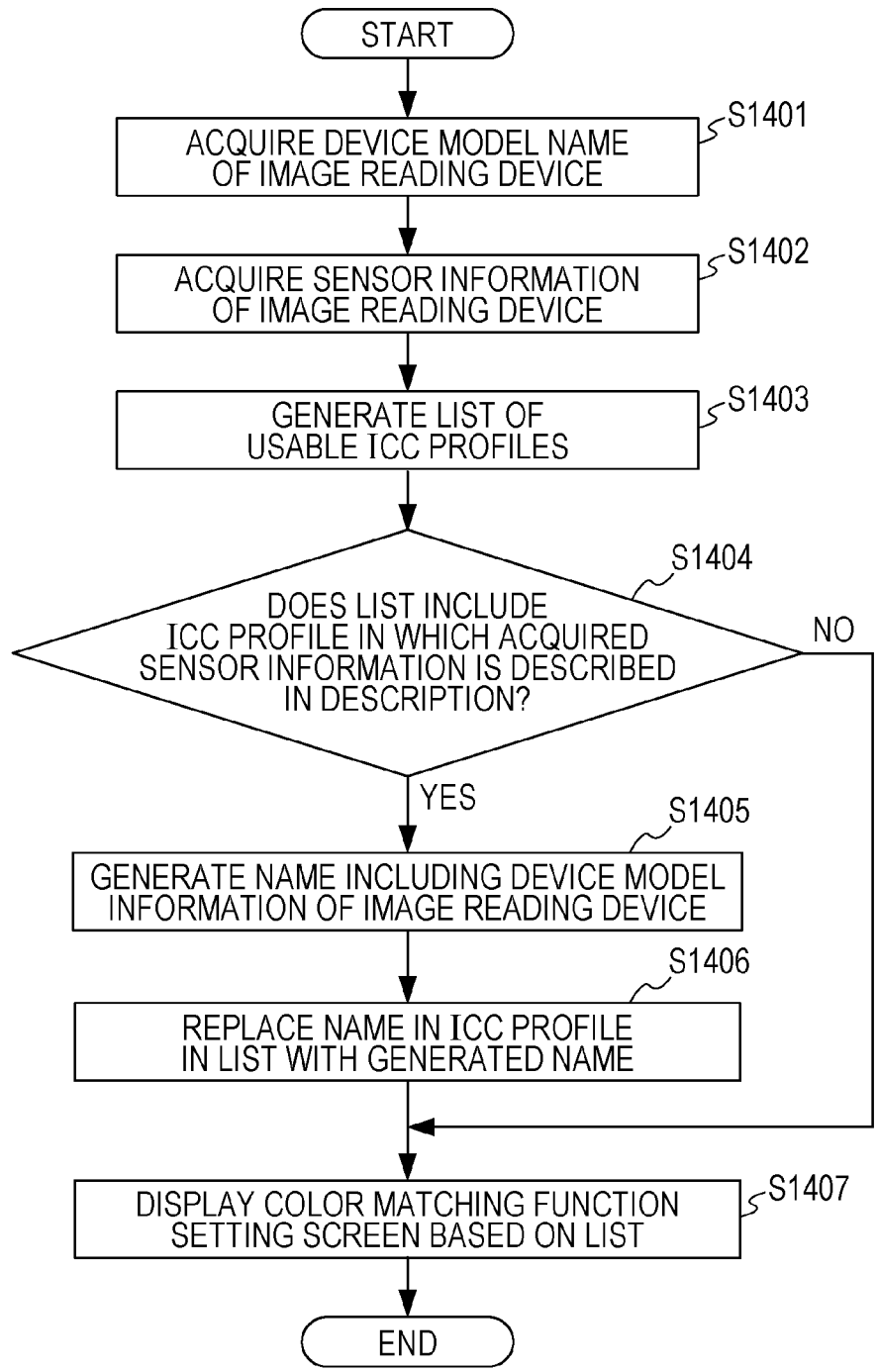
FIG. 13 is a flow chart of a process generating a profile list according to the fourth embodiment.

FIG. 13 is a flow chart of a process of generating a profile list to be displayed on the color matching function setting screen according to the present embodiment. The process in FIG. 13 is realized, for example, by the CPU 201 by reading a program stored in the disk device 202 into the memory 204 and executing it.

In S1401 in FIG. 13, the device model information acquisition unit 1301 of the device driver acquires information in terms of a device model name of the image reading device 100 by communicating with the image reading device 100 via the device control unit 1309.

In S1402, the sensor information acquisition unit 1302 of the device driver acquires sensor information of the image reading device 100 as the information in terms of the device type to be used by communicating with the image reading device 100 via the device control unit 1309.

Figure 14:
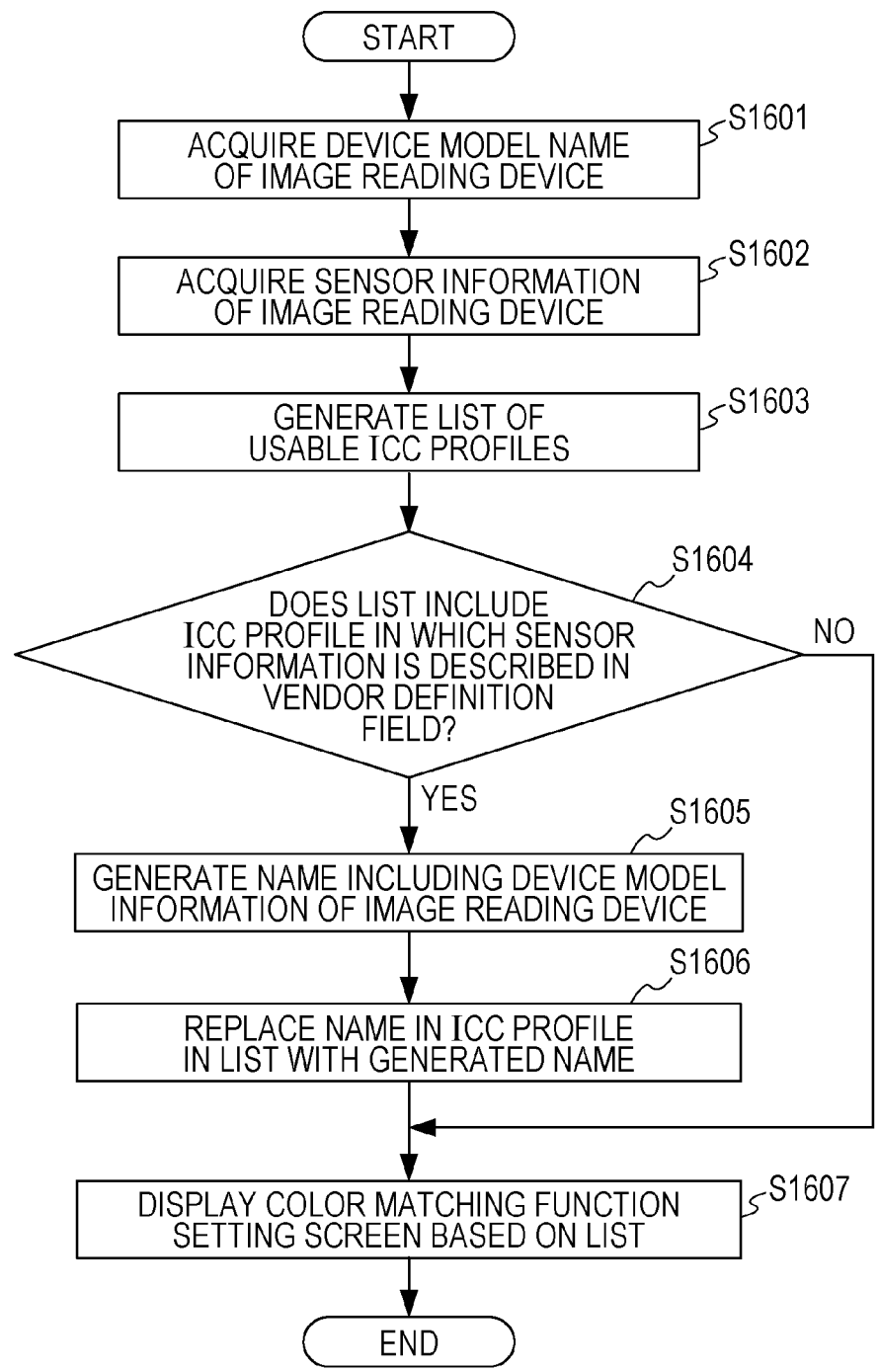
FIG. 14 is a flow chart of a process generating a profile list according to a fifth embodiment.

S1403 to S1407 in FIG. 14 are similar to S603 to S607 in FIG. 6, and thus a further description thereof is omitted.

In the present embodiment, information in terms of a device model name and sensor information of an image reading device are acquired from the image reading device. The ICC profile is then rewritten such that the description including the sensor information of the image reading device is replaced by the description including the information in terms of the device model name of the image reading device, and the result is provided to a user. This makes it easier for the user to select an ICC profile suitable for the device (the image reading device) to be used.

The present embodiment is applicable not only to a device driver specific to a device model, but also to a device driver used in common by a particular device model, such as a class driver.

In the present embodiment, as described above, ICC profiles are grouped such that ICC profiles associated with the same sensor are grouped, and one ICC profile is shared by each group. This makes it possible to reduce the total data size of ICC profiles stored in the PC 200. That is, it becomes possible to reduce the necessary disk capacity of the disk device 202.

Fifth Embodiment

A fifth embodiment is described below with reference to FIG. 14. In the first to fourth embodiments described above, the group of an ICC profile is identified using the description of the ICC profile. In contrast, in the present embodiment, the group of an ICC profile is identified using a field defined by a device model characteristic vendor. Except for the above, the MFP 100 and the PC 200 are configured in a similar manner to the first embodiment, and thus a further duplicated description is omitted.

In the present embodiment, a device driver for controlling an image processing apparatus is similar in configuration to that illustrated in FIG. 5 except that the profile determination unit 504 performs determination differently. In the present embodiment, the profile determination unit 504 determines whether the display list includes a description of an ICC profile in which information in terms of sensor information acquired by the sensor information acquisition unit 502 is described in a field defined by a device model characteristic vendor.

FIG. 14 is a flow chart of a process of generating a profile list to be displayed on the color matching function setting screen according to the present embodiment. The process in FIG. 14 is realized, for example, by the CPU 201 by reading a program stored in the disk device 202 into the memory 204 and executing it.

S1601 to S1603 in FIG. 14 are similar to S601 to S603 in FIG. 6, and thus a further description thereof is omitted.

In S1604 in FIG. 14, the profile determination unit 1504 determines whether the display list includes a description of an ICC profile in which information in terms of sensor information acquired in S1602 is described in a field defined by a device model characteristic vendor. If the display list includes a description of an ICC profile in which information in terms of sensor information is described in a field defined by a device model characteristic vendor, (Yes in S1604), the processing flow proceeds to S1605. If the display list does not include a description of an ICC profile in which information in terms of sensor information is described in a field defined by a device model characteristic vendor, (No in S1604), the processing flow proceeds to S1607. S1605 to S1607 in FIG. 14 are similar to S605 to S607 in FIG. 6, and thus a further description thereof is omitted.

In the present embodiment, the description to be displayed in the display list is replaced by the description including the information in terms of the device model name of the image reading device, and the result is provided to a user thereby achieving advantageous effects similar to those achieved in the first embodiment.

Sixth Embodiment

A sixth embodiment is described below with reference to FIGS. 15 to 17. In the present embodiment, a device driver manages group identification information of ICC profiles and descriptions to be provided to a user. Except for the above, the MFP 100 and the PC 200 are configured in a similar manner to the first embodiment, and thus a further duplicated description is omitted.

Figure 15:
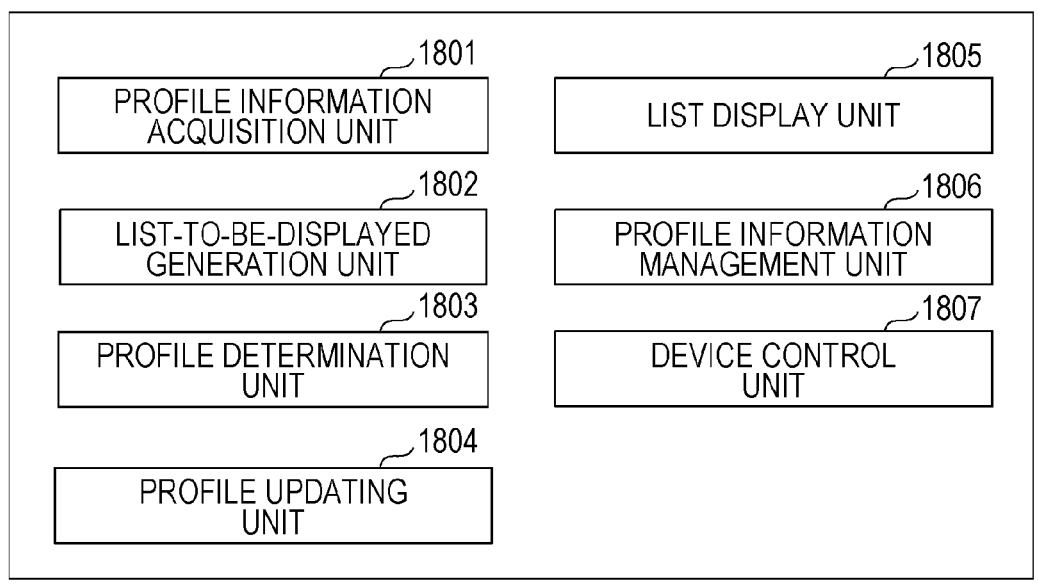
FIG. 15 is a diagram illustrating a configuration of a device driver on an information processing apparatus according to a sixth embodiment.

FIG. 15 is a diagram illustrating a configuration of a device driver configured to control an image reading device according to the present embodiment. The device driver includes a profile information acquisition unit 1801, a display list generation unit 1802, a profile determination unit 1803, a profile update unit 1804, a display-list display unit 1805, a profile information management unit 1806, and a device control unit 1807.

The profile information acquisition unit 1801 acquires, from the profile information management unit, group identification information (sensor information in the present embodiment) of an ICC profile and a description (information in terms of a device model in the present embodiment) to be provided to a user.

The display list generation unit 1802 generates, based on usable ICC profiles, a display list to be displayed on the display-list display unit 1805.

The profile determination unit 1803 determines whether the display list includes a description of an ICC profile including the information acquired by the profile information acquisition unit 1801.

The profile update unit 1804 updates the description included in the display list.

The display-list display unit 1805 provides the display list.

The profile information management unit 1806 manages the group identification information of the ICC profiles and the descriptions to be provided to a user.

The device control unit 1807 communicates with the image reading device to control a printing operation, a scanning operation, or the like and control communication in acquiring device model information, status information, or the like.

Figure 16:
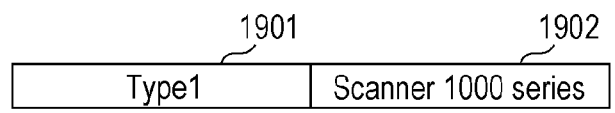
FIG. 16 is a diagram illustrating information described in an ICC profile corresponding to an image reading device according to a sixth embodiment.

FIG. 16 is a diagram illustrating information described in an ICC profile managed by the profile information management unit 1806 of the device driver according to the present embodiment. In FIG. 16, 1901 denotes group identification information of the ICC profile. In this example, the group identification information indicates that Type 1 is assigned as group identification information to Scanner 1000 series. In FIG. 16, 1902 denotes a description to be provided to a user. Although Scanner 1000 series is taken as an example, ICC profile information is stored and managed in a similar manner for other image processing apparatuses.

FIG. 17 is a flow chart of a process of generating a profile list to be displayed on the color matching function setting screen according to the present embodiment. The process in FIG. 17 is realized, for example, by the CPU 201 by reading a program stored in the disk device 202 into the memory 204 and executing it.

In S2001, the profile information acquisition unit 1801 acquires, from the profile information management unit 1806, group identification information of an ICC profile and a description (information in terms of a device model in the present embodiment) to be provided to a user.

In S2002, the display list generation unit 1802 generates a display list from usable ICC profiles.

In S2003, the profile determination unit 1803 determines whether the display list includes a description of an ICC profile in which group identification information of the ICC profile acquired in S2001 is described as a description thereof. If such a description is included in the display list generated in S2002 (Yes in S2003), the processing flow proceeds to S2004. If such a description is not included in the display list generated in S2002 (No in S2003), the processing flow proceeds to S2005.

In S2004, the profile update unit 1804 rewrites the display list generated in S2002 such that the description including the group identification information of the ICC profile acquired in S2001 is replaced by the description acquired in S2001 to be provided to a user. That is, the description is replaced by the information about the device model.

In S2005, the display-list display unit 1805 of the device driver displays the color matching function setting screen on the display unit 205 based on the display list generated in S2002 or the display list updated in S2004.

In the present embodiment, advantageous effects similar to those achieved in the first embodiment are achieved by managing the group identification information of the ICC profile and the description to be provided to a user by the device driver.

Furthermore, in the present embodiment, the profile update unit 1804 performs the replacement using the description to be provided to a user acquired by the profile information acquisition unit 1801 from the profile information management unit 1806, but the manner of the replacement is not limited to this. As in the first embodiment described above, a description including information associated with an apparatus may be generated and the replacement may be performed using the generated description. Furthermore, in the present embodiment, although group identification information of an ICC profile is described in the description of the ICC profile, the group identification information may be described in another field such as a field defined by a device model characteristic vendor.

The present embodiment makes it easier to select an ICC profile suitable for a device to be used.

Other Embodiments

Note that the present disclosure are not limited to the embodiments described above. For example, in the embodiments described above, the explanation has been given taking the image reading device, which is an image input device, as an example, but the embodiments may be applied to a case in which an output color profile is set when printing is performed using an image output device.

In the first to fourth embodiments and the sixth embodiment described above, each ICC profile is identified using, by way of example but not limitation, a description. Proper information included in each ICC profile may be employed to identify the ICC profile.

Furthermore, in the embodiments described above, grouping is performed according to, by way of example but not limitation, sensors such that one ICC profile is shared by each group. Grouping may be performed according to another factor as long as the same profile is allowed to be used by devices in each group.

Furthermore, in the embodiments described above, the explanation is given as to, by way of example but not limitation, displaying of ICC profiles. The embodiments may also be applied to a case where setting is performed via a setting screen in terms of other characteristic information dependent on devices. For example, the present disclosure may also be used in a case where characteristic information is different depending on the type of a print head of a printing device functioning as an output device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-247330, filed Dec. 5, 2014 which is hereby incorporated by reference herein in its entirety.

What is claimed is:

1. A non-transitory computer readable recording medium configured to cause a computer of an information processing apparatus to execute a method, the information processing apparatus being capable of controlling a peripheral device that performs at least one of an image input operation and an image output operation based on an ICC profile and configured to store a plurality of ICC profiles in a storage unit, the method comprising:
 obtaining information about a peripheral device to be controlled included in peripheral devices that the information processing apparatus is capable of controlling; and
 displaying a selection field on a display unit for a user to select one of the plurality of ICC profiles,
 wherein information about an ICC profile corresponding to the obtained information and information about an ICC profile not corresponding to the obtained information are displayed in parallel in the selection field,
 wherein not a description of the ICC profile corresponding to the obtained information but information about a name of the peripheral device to be controlled is displayed as the information about the ICC profile corresponding to the obtained information, and
 wherein an ICC profile corresponding to information selected from the information displayed in the selection field is used in color conversion performed in the image input operation or the image output operation.

2. The non-transitory computer readable recording medium according to claim 1,
 wherein at least one of the plurality of ICC profiles is shared by peripheral devices of plural models, and
 wherein, as the information about the ICC profile corresponding to the obtained information, neither the description of the ICC profile corresponding to the obtained information nor names of peripheral devices of models other than a model of the peripheral device to be controlled included in the peripheral devices of plural models sharing the ICC profile corresponding to the obtained information are displayed but information about the name of the peripheral device to be controlled is displayed.

3. The non-transitory computer readable recording medium according to claim 1,
 wherein at least one of the plurality of ICC profiles is shared by peripheral devices of plural models, and
 wherein a description of the ICC profile not corresponding to the obtained information is displayed as the information about the ICC profile not corresponding to the obtained information, and information about names of the peripheral devices of plural models sharing the ICC profile not corresponding to the obtained information is not displayed.

4. The non-transitory computer readable recording medium according to claim 3,
 wherein the peripheral devices that the information processing apparatus is capable of controlling are grouped in accordance with characteristics of the peripheral devices,
 wherein a first ICC profile included in the plurality of ICC profiles corresponds to information about a peripheral device belonging to a first group, and a second ICC profile included in the plurality of ICC profiles corresponds to information about a peripheral device belonging to a second group, and
 wherein information that identifies a group that an ICC profile belonging to is displayed as a description of the ICC profile corresponding to the group displayed in the selection field.

5. The non-transitory computer readable recording medium according to claim 1,
 wherein an ICC profile is to be installed and stored in the storage unit, and
 wherein, in a case where the ICC profile to be installed is already stored in the storage unit, control for not storing the ICC profile to be installed in the storage unit again is performed.

6. The non-transitory computer readable recording medium according to claim 1,
 wherein the peripheral devices that the information processing apparatus is capable of controlling are grouped in accordance with characteristics of the peripheral devices, and
 wherein, in a case where an ICC profile corresponding to information about a peripheral device belonging to a predetermined group is already stored in the storage unit, control for not storing the ICC profile corresponding to the information about the peripheral device belonging to the predetermined group in the storage unit again is performed.

7. The non-transitory computer readable recording medium according to claim 1, wherein, in a case where the plurality of ICC profiles include plural ICC profiles corresponding to the obtained information, information about a first ICC profile included in the plural ICC profiles corresponding to the obtained information is displayed, and information about a second ICC profile included in the plural ICC profiles corresponding to the obtained information is not displayed.

8. The non-transitory computer readable recording medium according to claim 7, wherein the second ICC profile is generated earlier than the first ICC profile.

9. The non-transitory computer readable recording medium according to claim 1, wherein, in a case where information about a model of the peripheral device to be controlled and information about a sensor provided in the peripheral device to be controlled are obtained, and the plurality of ICC profiles include an ICC profile corresponding to the information about the model of the peripheral device to be controlled and an ICC profile corresponding to the information about the sensor provided in the peripheral device to be controlled, information about the ICC profile corresponding to the information about the model of the peripheral device to be controlled is displayed and the ICC profile corresponding to the information about the sensor provided in the peripheral device to be controlled is not displayed in the selection field.

10. A control method of an information processing apparatus, the information processing apparatus being capable of controlling a peripheral device that performs at least one of an image input operation and an image output operation based on an ICC profile and configured to store a plurality of ICC profiles in a storage unit, the control method comprising:
 obtaining information about a peripheral device to be controlled included in peripheral devices that the information processing apparatus is capable of controlling; and
 displaying a selection field on a display unit for a user to select one of the plurality of ICC profiles,
 wherein information about an ICC profile corresponding to the obtained information and information about an ICC profile not corresponding to the obtained information are displayed in parallel in the selection field,
 wherein not a description of the ICC profile corresponding to the obtained information but information about a name of the peripheral device to be controlled is displayed as the information about the ICC profile corresponding to the obtained information, and wherein an ICC profile corresponding to information selected from the information displayed in the selection field is used in color conversion performed in the image input operation or the image output operation.

11. The control method according to claim 10, wherein at least one of the plurality of ICC profiles is shared by peripheral devices of plural models, and wherein, as the information about the ICC profile corresponding to the obtained information, neither the description of the ICC profile corresponding to the obtained information nor device names of peripheral devices of models other than a model of the peripheral device to be controlled included in the peripheral devices of plural models sharing the ICC profile corresponding to the obtained information are displayed but information about the name of the peripheral device to be controlled is displayed.

12. The control method according to claim 10, wherein a description of the ICC profile not corresponding to the obtained information is displayed as the information about the ICC profile not corresponding to the obtained information, and information about a name of a peripheral device corresponding to the ICC profile not corresponding to the obtained information is not displayed.

13. The control method according to claim 10, wherein at least one of the plurality of ICC profiles is shared by peripheral devices of plural models, and wherein a description of the ICC profile not corresponding to the obtained information is displayed as the information about the ICC profile not corresponding to the obtained information, and information about names of the peripheral devices of plural models sharing the ICC profile not corresponding to the obtained information is not displayed.

14. The control method according to claim 13, wherein the peripheral devices that the information processing apparatus is capable of controlling are grouped in accordance with characteristics of the peripheral devices, wherein a first ICC profile included in the plurality of ICC profiles corresponds to information about a peripheral device belonging to a first group, and a second ICC profile included in the plurality of ICC profiles corresponds to information about a peripheral device belonging to a second group, and wherein information that identifies a group that an ICC profile belonging to is displayed as a description of the ICC profile corresponding to the group displayed in the selection field.

15. The control method according to claim 10, wherein an ICC profile is to be installed and stored in the storage unit, and wherein, in a case where the ICC profile to be installed is already stored in the storage unit, control for not storing the ICC profile to be installed in the storage unit again is performed.

16. The control method according to claim 10, wherein the peripheral devices that the information processing apparatus is capable of controlling are grouped in accordance with characteristics of the peripheral devices, and wherein the obtained information is information about a group of the peripheral devices to be controlled.

17. The control method according to claim 10, wherein the peripheral devices that the information processing apparatus is capable of controlling are grouped in accordance with characteristics of the peripheral devices, and wherein, in a case where an ICC profile corresponding to information about a peripheral device belonging to a predetermined group is already stored in the storage unit, control for not storing the ICC profile corresponding to the information about the peripheral device belonging to the predetermined group in the storage unit again is performed.

18. The control method according to claim 10, wherein, in a case where the plurality of ICC profiles include plural ICC profiles corresponding to the obtained information, information about a first ICC profile included in the plural ICC profiles corresponding to the obtained information is displayed, and information about a second ICC profile included in the plural ICC profiles corresponding to the obtained information is not displayed.

19. The control method according to claim 18, wherein the second ICC profile is generated earlier than the first ICC profile.

20. The control method according to claim 10, wherein, in a case where information about a model of the peripheral device to be controlled and information about a sensor provided in the peripheral device to be controlled are obtained, and the plurality of ICC profiles include an ICC profile corresponding to the information about the model of the peripheral device to be controlled and an ICC profile corresponding to the information about the sensor provided in the peripheral device to be controlled, information about the ICC profile corresponding to the information about the model of the peripheral device to be controlled is displayed and the ICC profile corresponding to the information about the sensor provided in the peripheral device to be controlled is not displayed in the selection field.

21. A control method of an information processing apparatus, the information processing apparatus being capable of controlling a peripheral device that performs at least one of an image input operation and an image output operation based on an ICC profile and configured to store a plurality of ICC profiles in a storage unit, the control method comprising:

displaying a selection field on a display unit for a user to select one of the plurality of ICC profiles, wherein information about an ICC profile corresponding to the peripheral device to be controlled included in peripheral devices that the information processing apparatus is capable of controlling and information about an ICC profile not corresponding to the peripheral device to be controlled are displayed in parallel in the selection field, wherein not a description of the ICC profile corresponding to the peripheral device to be controlled but information about a name of the peripheral device to be controlled is displayed as the information about the ICC profile corresponding to the peripheral device to be controlled, and wherein an ICC profile corresponding to information selected from the information displayed in the selection field is used in color conversion performed in the image input operation or the image output operation.

* * * * *